(12) United States Patent
Hadir et al.

(10) Patent No.: US 11,214,196 B1
(45) Date of Patent: Jan. 4, 2022

(54) APPARATUS, SYSTEM AND METHOD FOR ENHANCED DRIVER VISION BASED ON ROAD LEVEL CHARACTERISTICS

(71) Applicants: Volkswagen Aktiengesellschaft, Wolfsburg (DE); AUDI AG, Ingolstadt (DE); Dr. Ing. h.c. F. Porsche Aktiengesellschaft, Stuttgart (DE)

(72) Inventors: Najib Hadir, San Francisco, CA (US); Jordan Pringle, Santa Clara, CA (US); Subramanian Swaminathan, Belmont, CA (US); Andre Guilherme Linarth, Saratoga, CA (US)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/945,156

(22) Filed: Jul. 31, 2020

(51) Int. Cl.
  *B60R 1/00* (2006.01)
  *B60Q 9/00* (2006.01)
  (Continued)

(52) U.S. Cl.
  CPC ............ *B60R 1/00* (2013.01); *B60Q 9/00* (2013.01); *G01S 19/42* (2013.01); *H04N 5/2253* (2013.01);
  (Continued)

(58) Field of Classification Search
  CPC ........... G06K 9/00778; G06K 9/00785; G06K 9/00791; G06K 9/00798; G06K 9/00805; G06K 9/00812; G06K 9/00818; G06K 9/00825; G06K 9/00845; G06K 9/325; G06K 2209/15; G06K 2209/23; G06T 2207/30236; G06T 2207/30248; G06T 2207/30252; G06T 2207/30256; G06T 2207/30261; G06T 2207/30264; G06T 2207/30268; G08G 1/16; G08G 1/116; G08G 1/167; G08G 1/168; G08G 1/20; B60W 50/14; B60W 2050/143; B60W 2550/10; B60W 2550/14; B60R 2001/1215; B60R 1/00; B60R 2025/1013;
  (Continued)

(56) References Cited

U.S. PATENT DOCUMENTS

| 10,179,543 B2 | 1/2019 | Rathi et al. |
| 2012/0263383 A1 * | 10/2012 | Otuka ................ G06K 9/00798 |
| | | 382/195 |

(Continued)

FOREIGN PATENT DOCUMENTS

CN   110979183 A   *   4/2020

*Primary Examiner* — Nathnael Aynalem
(74) *Attorney, Agent, or Firm* — Loza & Loza, LLP; Peter Zura (57) ABSTRACT

A system, apparatus and method for enhancing a driver's field of view in a vehicle. Sensor data may be generated, via one or more first sensors, relating a pitch angle of the vehicle and received in a processing apparatus, which further determines if the pitch angle of the vehicle exceeds a configured pitch angle threshold for a configured period of time. One or more control signals may be transmitted to activate one or more cameras configured to capture image data at least in a front area of the vehicle if the processing apparatus determines that the pitch angle exceeds the configured pitch angle for the configured period of time. The captured image data may then be displayed on a display unit.

19 Claims, 9 Drawing Sheets

(51) Int. Cl.
*G01S 19/42* (2010.01)
*H04N 5/225* (2006.01)
*H04N 5/247* (2006.01)
*H04N 5/232* (2006.01)
*H04N 7/18* (2006.01)

(52) U.S. Cl.
CPC ......... *H04N 5/23299* (2018.08); *H04N 5/247* (2013.01); *H04N 7/181* (2013.01); *B60R 2300/10* (2013.01); *B60R 2300/20* (2013.01); *B60R 2300/802* (2013.01)

(58) Field of Classification Search
CPC ...... B60R 2025/1016; B60R 2300/105; B60R 2300/106; B60R 2300/806; B60R 2300/8066; B60R 2300/8073; B60R 2300/8086; B60R 2300/8093; G01S 17/93; G01S 17/931; B62D 15/029; H04W 4/40; H04N 5/23299; B06R 1/00

USPC ........................................................ 348/148
See application file for complete search history.

(56) References Cited

U.S. PATENT DOCUMENTS

| | | | |
|---|---|---|---|
| 2014/0142798 | A1* | 5/2014 | Guarnizo Martinez . G08G 1/16 701/23 |
| 2016/0101734 | A1* | 4/2016 | Baek ....................... B60R 11/04 348/148 |
| 2016/0114727 | A1* | 4/2016 | Watanabe ................ H04N 7/18 348/118 |
| 2019/0061621 | A1 | 2/2019 | Chae et al. |
| 2020/0132473 | A1* | 4/2020 | Shipley ................... G01S 19/49 |
| 2020/0148113 | A1* | 5/2020 | Coburn ................... H04N 7/181 |
| 2021/0141294 | A1* | 5/2021 | Hwang ................ G03B 17/561 |

* cited by examiner

APPARATUS, SYSTEM AND METHOD FOR ENHANCED DRIVER VISION BASED ON ROAD LEVEL CHARACTERISTICS

TECHNICAL FIELD

The present disclosure relates to vehicle image and/or sensor control and processing. More specifically, the present disclosure is directed to controlling vehicle cameras and/or sensors based on an incline or decline of a road level or grade.

BACKGROUND

Modern day vehicle technology has advanced to allow drivers to "see" driving conditions or objects using cameras and/or sensors. In the case of cameras, technology such as front view cameras are configured where one camera may be configured in the middle of the front grille, and a plurality of ultra-wide-angle cameras look down from the side view mirrors along the flanks on the car. A fourth camera may be positioned just above the license plate, where software stitches the four images together and inserts an image of a vehicle in the middle. Similarly, rear view cameras may be configured to provide enhanced camera viewing of a driver's rear surroundings. Also, top-view cameras (also known as 360-degree, surround-view, or "birds-eye" cameras) may be configured around the vehicle body (e.g., inside a vehicle's front grille or driver compartment, above the rear license plate, and one each under the wing mirror housing) to provide enhanced driver vision in all directions.

In such cases, the vehicle cameras are typically triggered by a gear setting (e.g., reverse), or triggered at low speeds (e.g., less than 10 mph). Presently, vehicle cameras are not configured or optimized to provide drivers with enhanced vision capabilities, particularly in uniquely dangerous driving environments associated with road level characteristics. For example, on terrains that have steep inclines and/or declines, lower portions of driver vision will typically be obscured or blocked as a vehicle enters and/or exits an apex or peak portion of an incline. As vehicle cameras and/or sensors are not typically configured to be active during normal driving conditions, they have not been able to be optimized to provide enhanced driver vision in such situations. Accordingly, technologies and techniques are needed to enhance driver vision to improve the safety of the driver, passengers and pedestrians.

SUMMARY

Various apparatus, systems and methods are disclosed herein relating to enhancing driver vision based on road level characteristics. In some illustrative embodiments, a system is disclosed for enhancing a driver's field of view in a vehicle, where the system comprises one or more first sensors configured to provide sensor data relating a pitch angle of the vehicle; a processing apparatus, operatively coupled to the one or more first sensors, wherein the processor is configured to receive data from the one or more first sensors; one or more cameras, operatively coupled to the processing apparatus, wherein the one or more cameras are configured to capture image data at least in a front area of the vehicle; and a display unit, operatively coupled to the processing apparatus, wherein the processing apparatus is configured to determine if the pitch angle of the vehicle exceeds a configured pitch angle threshold for a configured period of time, transmit one or more control signals to activate the one or more cameras if the processing apparatus determines that the pitch angle exceeds the configured pitch angle for the configured period of time, and display the captured image data on the display unit.

In some illustrative embodiments, a method is disclosed for enhancing a driver's field of view in a vehicle, the method comprising generating sensor data, via one or more sensors, relating a pitch angle of the vehicle; receiving, via a processing apparatus, data from the one or more first sensors; determining, via the processing apparatus, if the pitch angle of the vehicle exceeds a configured pitch angle threshold for a configured period of time; transmitting, via the processing apparatus, one or more control signals to activate one or more cameras configured to capture image data at least in a front area of the vehicle if the processing apparatus determines that the pitch angle exceeds the configured pitch angle for the configured period of time; and displaying, via a display unit, the captured image data on the display unit.

In some illustrative embodiments, a system is disclosed for enhancing a driver's field of view in a vehicle, wherein the system comprises one or more first sensors configured to provide sensor data relating a pitch angle of the vehicle; a processing apparatus, operatively coupled to the one or more first sensors, wherein the processor is configured to receive data from the one or more first sensors; one or more cameras, operatively coupled to the processing apparatus, wherein the one or more cameras are configured to capture image data at least in a front area outside a driver field of view for the vehicle; and a display unit, operatively coupled to the processing apparatus, wherein the processing apparatus is configured to determine if the pitch angle of the vehicle exceeds a configured pitch angle threshold for a configured period of time, transmit one or more control signals to activate the one or more cameras to capture image data if the processing apparatus determines that the pitch angle exceeds the configured pitch angle for the configured period of time, and display the captured image data on the display unit.

In further embodiments, the systems and methods may also include one or more second sensors, configured to receive at least one of speed data or throttle position data, wherein a processing apparatus is configured to determine if the at least one of speed data or throttle position data exceeds one or more configured thresholds. The processing apparatus may be configured to transmit the one or more control signals to activate the one or more cameras if the processing apparatus further determines that the at least one of speed data or throttle position data exceeds one or more configured thresholds.

In further embodiments, the systems and methods may also include a global positioning system (GPS), wherein a processing apparatus is configured to record the position of the vehicle when transmitting the one or more control signals.

In still further embodiments, the systems and methods may include transmitting one or more further control signals to deactivate the one or more cameras if the processing apparatus determines that the pitch angle does not exceed the configured pitch angle for the configured period of time.

In still further embodiments, the systems and methods may include one or more further sensors, wherein the processing apparatus is configured to transmit one or more sensor control signals to modify operation of the one or more further sensors if the processing apparatus determines that the pitch angle exceeds the configured pitch angle for the configured period of time.

BRIEF DESCRIPTION OF THE FIGURES

The present invention is illustrated by way of example and not limitation in the figures of the accompanying drawings, in which like references indicate similar elements and in which.

DETAILED DESCRIPTION

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that the term "module" as used herein does not limit the functionality to particular physical modules, but may include any number of tangibly-embodied software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via Scalable Language ("Scala"), C, C++, C #, Java, Actionscript, Objective-C, Javascript, CSS, XML, etc.).

Figure 1:
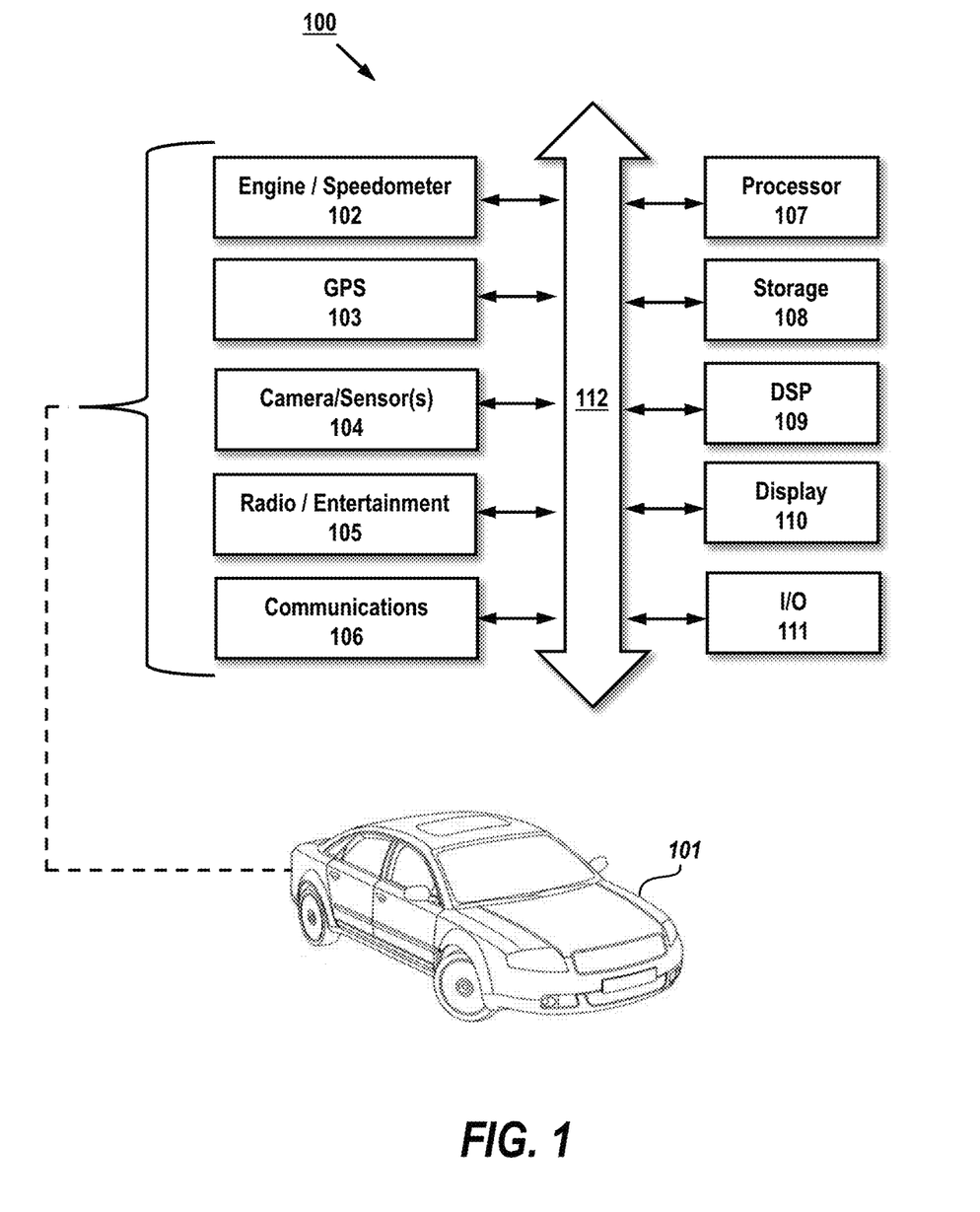
FIG. 1 shows an exemplary vehicle system block diagram showing multiple components and modules, together with a navigation system under an illustrative embodiment.

Turning to FIG. 1, the drawing illustrates an exemplary system 100 for a vehicle 101 comprising various vehicle electronics modules, subsystems and/or components. Engine/transmission module 102 is configured to process and provide vehicle engine and transmission characteristic or parameter data, and may comprise an engine control unit (ECU), and a transmission control. For a diesel engine, module 102 may provide data relating to fuel injection rate, emission control, NOx control, regeneration of oxidation catalytic converter, turbocharger control, cooling system control, and throttle control, among others. For a gasoline and/or hybrid engine, module 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals for any of gasoline, hybrid and/or electrical engines.

Global positioning system (GPS) module 103 provides navigation processing and location data for the vehicle 101. The camera/sensors 104 provide image or video data (with our without sound), and sensor data which may comprise data relating to vehicle characteristic and/or parameter data (e.g., from 102), and may also provide environmental data pertaining to the vehicle, its interior and/or surroundings, such as temperature, humidity and the like, and may further include LiDAR, radar, image processing, and computer vision. Radio/entertainment module 105 may provide data relating to audio/video media being played in vehicle 101. The radio/entertainment module 105 may be integrated and/or communicatively coupled to an entertainment unit configured to play AM/FM radio, satellite radio, compact disks, DVDs, digital media, streaming media and the like. Communications module 106 allows any of the modules of system 100 to communicate with each other and/or external devices (e.g., devices 202-203) via a wired connection (e.g., Controller Area Network (CAN bus), local interconnect network, etc.) or wireless protocol, such as Wi-Fi, Bluetooth, NFC, etc. In one embodiment, modules 102-106 may be communicatively coupled to bus 112 for certain communication and data exchange purposes.

Vehicle 101 may further comprise a main processor 107 (also referred to herein as a "processing apparatus") that centrally processes and controls data communication throughout the system 100. In some illustrative embodiments, the processor 107 is equipped with advanced driver assistance modules that allow for communication with and control of any of the modules in vehicle 100. The main processor 107 may be configured as a single processor or multiple processors. One or more of the components (e.g., 102-106, 108-111) of vehicle 101 may also be integrated into main processor 107 in some examples. Storage 108 may be configured to store data, software, media, files and the like, and may include vehicle data, sensor data and driver profile data, discussed in greater detail below. Digital signal processor (DSP) 109 may comprise a processor separate from main processor 107, or may be integrated within processor 107. Generally speaking, DSP 109 may be configured to take signals, such as voice, audio, video, temperature, pressure, position, etc. that have been digitized and then process them as needed. Display 110 may be configured to provide visual (as well as audio) indicial from any module in FIG. 1, and may be a configured as a LCD, LED, OLED, or any other suitable display. The display 110 may also be configured with audio speakers for providing audio output. Input/output module 111 is configured to provide data input and outputs to/from other peripheral devices, such as cell phones, key fobs, device controllers and the like. As discussed above, modules 107-111 may be communicatively coupled to data bus 112 for transmitting/receiving data and information from other modules.

Figure 2:
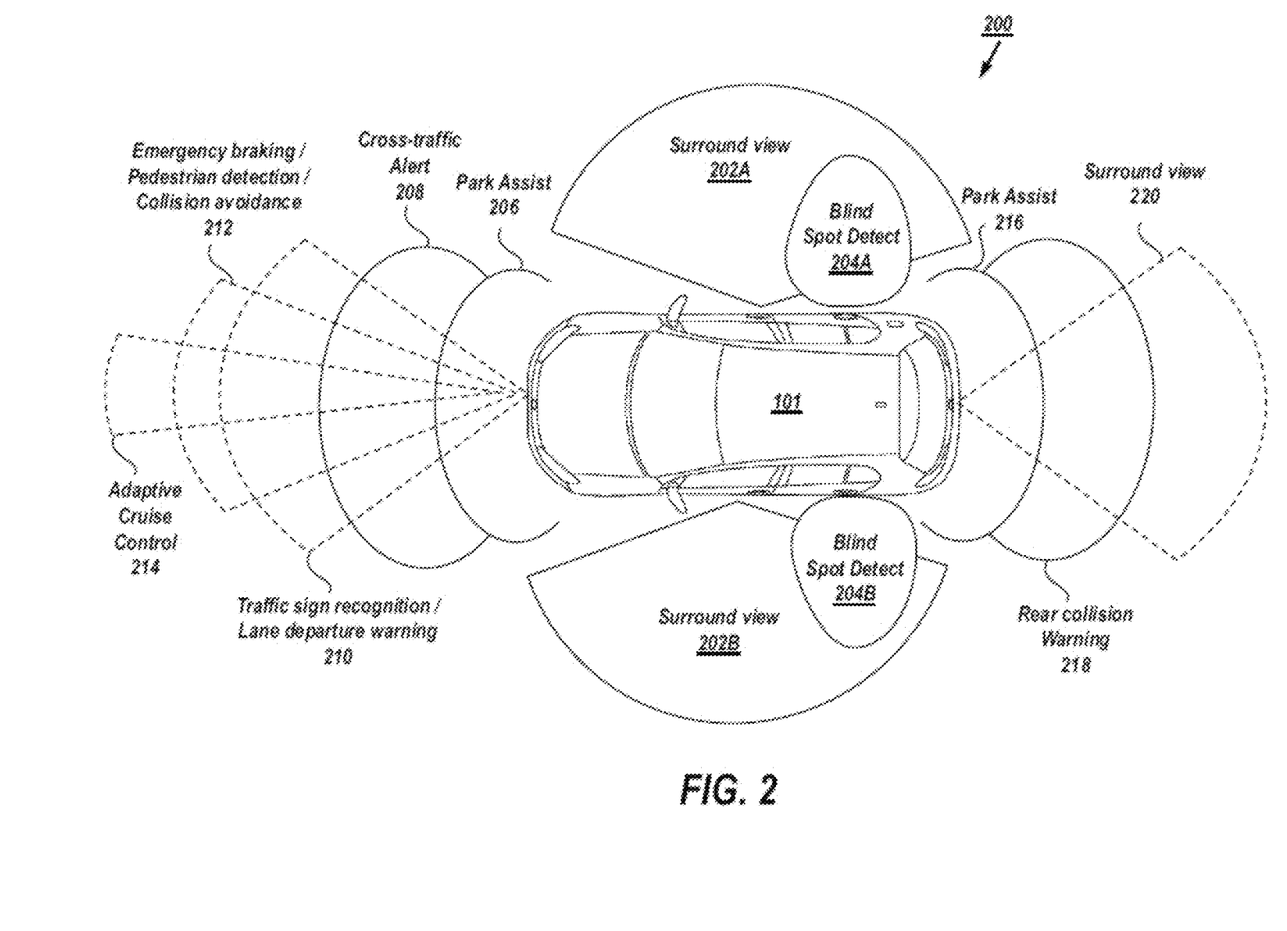
FIG. 2 shows a vehicle sensor system and configuration for providing sensor data for processing under an illustrative embodiment.

FIG. 2 is an exemplary embodiment of an advanced driver system 200 that includes components of FIG. 1, where the sensors 104 may include LiDAR, radar, image processing, computer vision, and may also include in-car networking, as well as additional inputs from other sources separate from the primary vehicle platform via communications 106, such as Vehicle-to-vehicle (V2V), or Vehicle-to-Infrastructure (such as mobile telephony or Wi-Fi data network) communication and systems. Using various individual and/or combinations of sensors (e.g., 104), vehicle 101 may be also equipped with top view and/or surround view (202A, 202B), that may be configured, under one embodiment, as one or more cameras mounted in a vehicle area that covers at least a portion of a driver field of view (e.g., eye-level), such as a windshield, vehicle roof, in or near a cabin rear-view mirror, a vehicle dashboard, vehicle hood, front grill, etc. Under some embodiments, a top view camera may be configured using a camera in the middle of a front grille of the vehicle, dual ultra-wide-angle cameras from the side view mirrors along the flanks on the car, and another positioned above the license plate, under one example. During operation, software may stitch the images together and insert an image of the vehicle in the middle. Of course, those skilled in the art will recognize that other configurations are possible and contemplated in the present disclosure. Blind spot detectors 204A, 204B may be configured using sensors, such as surround view sensors (202A, 202B), and/or be equipped with independent sensors that use imaging and/or electromagnetic waves to detect other vehicles and/or objects present in the vehicle's blind spot.

A front portion of the vehicle 101 may be equipped with park assist 206, cross-traffic alert 208, traffic sign recognition and lane departure warning 210, emergency braking/pedestrian detection/collision avoidance 212 (collectively "collision avoidance") and adaptive cruise control 214. A rear portion of the vehicle 101 may be equipped with park assist 216, rear collision warning 218 and surround view 220. In some illustrative embodiments, park assist 206, as well as rear park assist 216 may utilize the processor/ADS 107 which may be operatively coupled to the vehicle's sensors 104, that may include sonar, one or more backup cameras and additional forward sensors on the front side fenders. The sonar and sensors may be configured on the forward and rear bumpers to detect obstacles, allowing the vehicle to sound warnings and calculate optimum steering angles during regular parking. During operation, the processor(s) (e.g., 107) may calculate steering angle data which are displayed on a navigation/camera touchscreen (e.g., 103) along with obstacle information. When the vehicle is shifted to reverse, the backup camera screen features parking buttons which can be used to activate automated parking procedures. When activated, the processor (e.g., 107) may calculate an optimum parallel or reverse park steering angles and then interfaces with the electric power steering systems (e.g., 102) of the vehicle 101 to guide the car into a parking spot. The cross-traffic alert 208 and rear-collision warning 218 may be incorporated as independent modules or configured as part of the blind-spot detection (204A, 204B). Cross traffic alert 208 and rear-collision warning 318 utilize sensors for vehicle detection while in drive (208) or may activate when the vehicle is in reverse (218). During operation, they detect vehicles that might be crossing into a forward or rearward path, and, when an oncoming vehicle is detected, the system generates an alert.

Traffic recognition/lane departure warning module 210 may include a forward-facing camera that may be incorporated with other modules of FIG. 2, and is configured to scan a road ahead for traffic signs. This camera is connected to character recognition software, which may monitor and process any changes described by the signs, and relaying it onto the car's instrument panel. A lane departure module of 210 captures a moving view of the road ahead. The digitized image is parsed for straight or dashed lines (i.e., the lane markings). As the car deviates and approaches or reaches a lane marking, the vehicle issues a warning. The lane departure module 210 may incorporate a lane assist feature, where, if a vehicle reaches a lane marking, the vehicle, via assisted steering, may move itself away from the marker. Sometimes the steering change may be effected by braking the opposite front wheel, pivoting the vehicle.

Collision avoidance module 212 may be configured as a radar (all-weather) and may incorporate laser and camera to detect an imminent collision. Once the detection is processed, the module 212 may provide a warning to the driver when there is an imminent collision, and/or control the vehicle autonomously without any driver input (by braking or steering or both). Adaptive cruise control module 214 (or "autonomous cruise control") may be a laser-based system and/or radar-based system, where the sensors automatically adjust the vehicle speed to maintain a safe distance from vehicles ahead. If configured as a cooperative adaptive cruise control system. the module 214 further extends the automation of navigation by using information gathered from fixed infrastructure such as satellites and roadside beacons, or mobile infrastructure such as reflectors or transmitters on the back of other vehicles.

The sensor architecture for ADS 200 may be configured to have a data input portion that may include all information received from the sensors installed in a vehicle, including vehicle communication (e.g., 106), which may include technologies like Vehicle-to-Vehicle (V2V) and Vehicle-to-Infrastructure (V2I) communications that may communicate, or be integrated with, the GPS. Utilizing V2I technology, the vehicle communication may receive data/information relating to hazardous situations (e.g., congestions, accidents, obstacles etc.), merging assistance, intersection safety, speed management, and rail crossing operations, among others. Additional data/information may include, but is not limited to, traffic jam notification, prior recognition of potential traffic jams, dynamic traffic light control, dynamic traffic control, and connected navigation. Utilizing V2V technology, the vehicle communication may receive data/information relating to warnings on entering intersections or departing highways, hazardous location warning (e.g., obstacle discovery, reporting accidents), sudden stop warnings (e.g., forward collision warning, pre-crash sensing or warning) and lane change/keeping warnings/assistance. Additional data/information may include, but is not limited to, enhanced route guidance and navigation, intelligent intersections data (e.g., adaptable traffic lights, automated traffic intersection control, green light optimal speed advisory, merging assistance (e.g., entering an on-ramp to a limited access roadway), variable speed limits, pull-over commands and speed measurements.

In addition to information/data generated from vehicle (e.g., 101) data, information/data from other vehicles may be received in vehicle communication module 106, such as speed, acceleration, distance to preceding vehicle, current time gap, control activation, and so on. All data from vehicle communication module 106 may be included on the CAN bus data structure and communicated to a CAN module, which may be part of processor 107, or other suitable module. The information/data may also include detection and assignment of vehicle position sequence, which may be carried out by the vehicle communication module 106 using the GPS 103 and may utilize Wider Area Augmentation System (WAAS) differential corrections.

Vehicle (e.g., 101) information/data is also obtained from the on-board camera/sensors (e.g., 104), which may include any of the sensors described herein and/or otherwise known in the art, as well as odometer data, which may include speed and acceleration data. Settings module may include flag signals to provide information/data on vehicle and sensor setting, as well as information regarding the interaction of the driver with the driver interface (e.g., activation or deactivation of the system or vehicle setting selection). This may include data from driver interface buttons and inputs associated with the ADAS system, which may include autonomous cruise control (ACC) and/or cooperative adaptive cruise control (CACC) settings and/or control signals.

The ACC CACC may include high-level and low-level controllers that are accessible to a driver, and may allow a driver to switch between them during operation to establish a driving mode (e.g., normal mode, eco-driving mode, sport mode, snow mode, etc.), which may be communicated to other vehicle modules for actuating the mode. For switching between modes, a control code may read the CAN bus information from a transmission mode selection button. As an example, when a sport mode is chosen, a high level controller may take the CACC controller output. When any of the other modes is chosen, an ACC controller output may be sent to a low-level controller. The CACC controller can be deactivated in the same way as the ACC, either using the driver interface inputs/buttons or pressing the brake pedal. An actuation portion may be part of the processor 107 and configured to execute target reference commands. As an example, the low-level controller may be configured to convert the target speed commands into throttle and brake actions, via the ACC controller.

Figure 3:
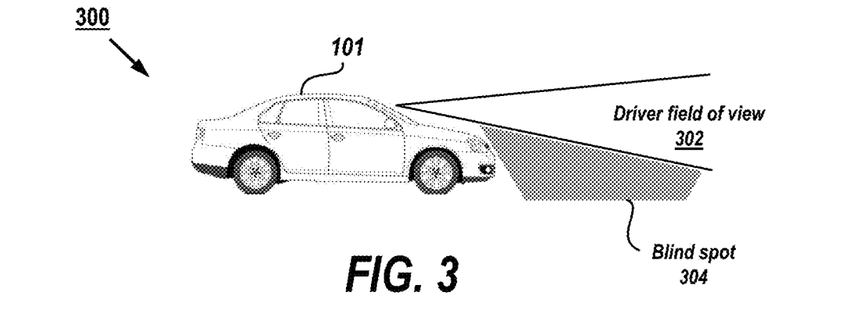
FIG. 3 shows an illustration of a vehicle with a driver field of view and resultant blind spot.

Turning to FIG. 3, the drawing shows an illustration 300 of a vehicle 101 with a driver field of view 302 and resultant blind spot 304. As can be seen in the figure, the driver field of view 302 has limitations, where, depending on the size and height of the vehicle, the windshield/hood configuration, and/or the height of the driver, the physical field of view (e.g., 302) will be restricted, resulting in a blind spot 304, in which the driver and/or passenger may not see anything. Modern vehicles are physically designed to have shapes that minimize blind spots (e.g., 304), and under normal driving conditions, do not typically present a hazard to a driver and/or persons or objects in front of a vehicle. However, when vehicles (e.g., 101) drive through hills having a steep slope, the blind spot 304 may present a potentially serious hazard.

Figure 3A:
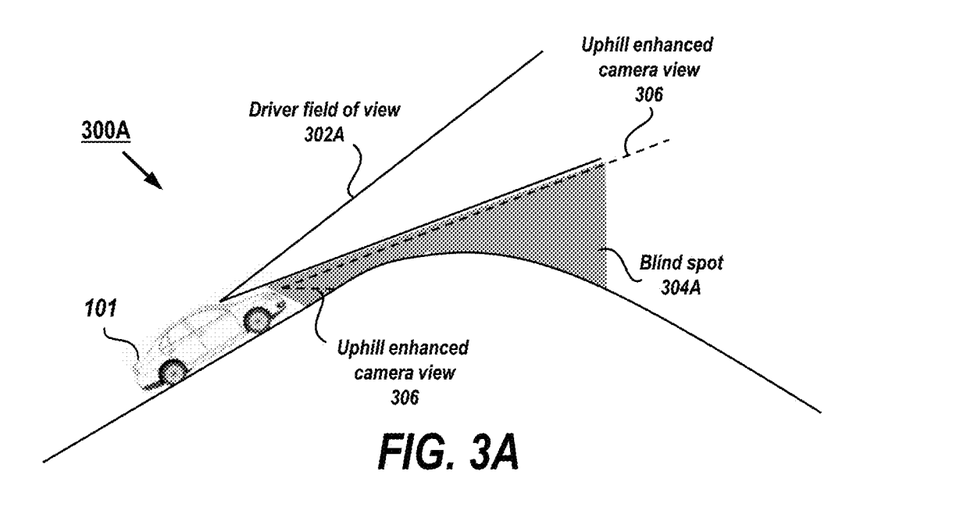
FIG. 3A shows an illustration of a vehicle on an incline approaching a hill apex, together with a driver field of view and an uphill enhanced camera view under one example.

FIG. 3A shows an illustration of a vehicle 101 on an incline approaching a hill apex, crest or peak, together with a driver field of view 302A and an uphill enhanced camera view 306 under one example. Similar to the illustration 300 of FIG. 3 the driver field of view 302A is forward to the vehicle, but is directed upward, in the direction of the vehicle 101 that is driving uphill. As can be seen in the figure, the uphill slope or grade causes the blind spot 304A to narrow slightly, then expand greatly past the apex or crest of the hill. If a person or object is physically located in the pathway of the vehicle in this area of the blind spot 304A, particularly at the apex of the hill, the driver of vehicle 101 may not see the person or object, potentially causing a collision. Alternately or in addition, sudden road changes (e.g., sharp turn) may not be perceptible in the driver field of view 302A.

Figure 3B:
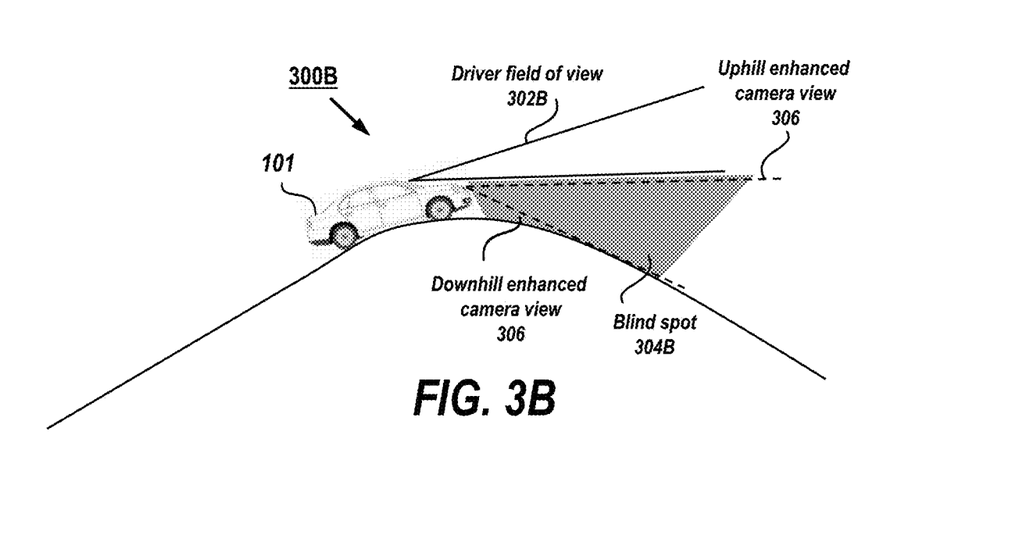
FIG. 3B shows an illustration of a vehicle on an incline at a hill apex, together with a driver field of view and an uphill enhanced camera view under one example.

FIG. 3B shows an illustration 300B of a vehicle 101 approaching an incline on a hill apex, together with a driver field of view 302C and a downhill enhanced camera view 304C under one example. Continuing from the illustration of 300A, the vehicle 101 now approaches, the apex of a hill (i.e., the vehicle begins to enter a negative slope state). As can be seen in the figure, at this point, the driver field of view 302B continues to extend forward from the vehicle 101, causing the blind spot 304B to expand further, until the vehicle becomes fully engaged in the hill decline. Again, objects and/or persons physically present in the blind spot 304B could potentially pose a hazard to the driver.

Figure 3C:
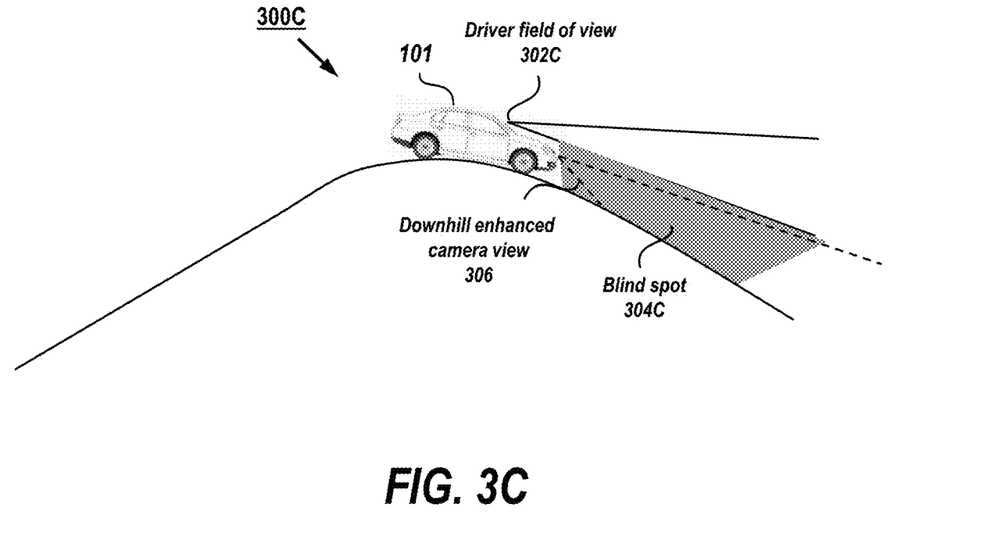
FIG. 3C shows an illustration of a vehicle on an incline on a hill apex, together with a driver field of view and a downhill enhanced camera view under one example.

FIG. 3C shows an illustration 300C of a vehicle 101 passing an incline on a hill apex, together with a driver field of view 302C and a downhill enhanced camera view 304C under one example. Continuing from the illustration of 300B, the vehicle 101 now approaches, and begins to pass, the apex of a hill (i.e., the vehicle begins to enter a negative slope state). As can be seen in the figure, at this point, the driver field of view 302C continues to extend forward from the vehicle 101, causing the blind spot 304C to expand, until the vehicle becomes fully engaged in the hill decline. Again, objects and/or persons physically present in the blind spot 304B could potentially pose a hazard to the driver.

Under some examples, the vehicle 101 may be equipped with a top-view camera (e.g., 104) or other similar device (e.g., 360' view, birds-eye view, surround view, etc.) that enhances and/or augments the driver's field of view. Thus, referring to FIG. 3A, a vehicle camera may be activated as the vehicle approaches the apex of the hill, generating an uphill enhanced camera view 306, which may be displayed to a driver via a screen or display (e.g., 110). While the figure shows the dotted lines for the uphill enhanced camera view 306 appearing below the driver field of view 302A, it should be understood by those skilled in the art that the uphill enhanced camera view 306 may include the driver field of view (302A-302C) in the video display, and extend beyond, to include at least a portion of blind spot areas (304A-304C), depending on the specific camera being used. Similarly, in the examples of FIG. 3B-3C, the camera may remain activated from 300A to generate a downhill enhanced camera view 306, extending the driver's field of view 302C to include the downhill enhanced camera view 306.

In some examples, the vehicle processing system (e.g. 107) may be configured to activate one or more vehicle cameras (e.g., 104) as a vehicle 101 approaches and/or passes a hill apex, enhancing the field of view for the driver, and displaying the enhanced view to the driver via a screen or display (e.g., 110). Such a configuration advantageously provides a driver with an enhanced view on the display in order to see potential hazards. Furthermore, by limiting the enhanced camera view display to instances where the hill incline/decline is steep enough to pose a hazard, driver distraction (e.g., from watching the screen) and/or driver inconvenience may be minimized. As used herein, "enhanced camera view" (or "hill view assist") may be defined as the use of one or more vehicle cameras to enhance or supplement a driver's natural field of view by providing visual indicia (e.g., via display) of a road environment that includes view portions that would not otherwise be seen by the driver.

Figure 4:
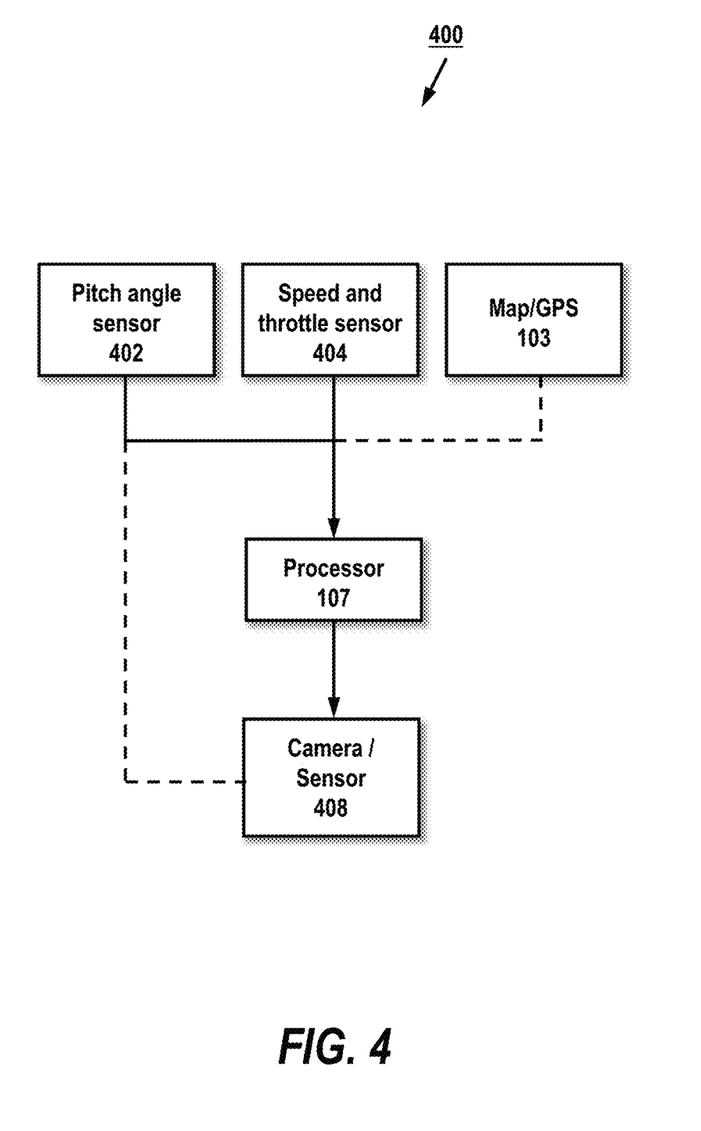
FIG. 4 shows a configuration for performing a hill view assist for a camera/sensor utilizing a pitch angle sensor, speed and throttle sensor and/or a GPS system under one example.

FIG. 4 shows a configuration 400 for performing an enhanced camera viewing (also referred to herein as "hill view assist") for a camera/sensor utilizing a pitch angle sensor 402, speed and throttle sensor 404 and/or a GPS system 103. Under one example, the pitch angle sensor 402 may be configured as an inclinometer, also known as a tilt sensor, clinometers or slope sensor, and is configured to measure the angle of the vehicle with respect to the force of gravity. The tilt or level meters in the inclinometer may determine the pitch and/or roll angle (e.g., the Y and/or Z axis relative to the horizontal plane of the vehicle), and output these values via the appropriate electrical interface (e.g., 107, 111). The pitch angle sensor 402 may include an accelerometer, which monitors the effect of gravity on a small mass suspended in an elastic support structure. When the vehicle tilts, the mass will move slightly, causing a change of capacitance between the mass and the supporting structure. The tilt angle may be calculated from the measured capacitances. In one example, the pitch angle sensor is configured as a micro-electromechanical system (MEMS) inclinometer.

In order to increase sensitivity and sensing speed, pitch angle sensor 402 should be configured with a relatively fast response (e.g., 0.05 s) and a clean signal output. In some examples, pitch angle sensor 402 may be configured as a dynamic inclinometer and include a 3-dimensional (3D) acceleration sensor and a 3D gyroscope. The 3D acceleration sensor may not be damped, and can follow rapid dynamic motions. At the same time, the 3D gyroscope may be configured to measure rotational speeds, based on inertia principles. Signals from the accelerometers and gyroscopes are combined in a processor (e.g., 107) to produce an inclination measurement that compensates the effects of accelerations. Accordingly, the accelerometer may be configured to measures the tilt position, while the gyroscope determines the rate of rotation. While acceleration may have an impact on the accelerometer readings, it would have a limited effect on the measured rotation rates of the gyroscope. Both signals may be combined in a processor (e.g., 107), to determine the best value out of each sensor in order to separate the actual position value from the errors introduced by external accelerations.

In some examples, the pitch angle sensor 402 may be a single sensor, preferably mounted on a center of gravity point of a vehicle (e.g., 101). In another example, pitch angle sensor 402 may be a sensor system including a plurality of sensors, configured in the area of a front and rear portion of the vehicle (e.g., on a front and rear wheel axel), in the area of each end of the front and rear portion of the vehicle (e.g., L/R front wheel axel, L/R rear wheel axel), or other suitable configuration. Using a configuration where the pitch angle sensors are configured to determine left/right front elevation and left/right rear elevation, a pitch angle may be determined at any point by:

$$\beta = \tan^{-1}\left[\frac{(|F_{avg}| - |R_{avg}|)}{V_B}\right]$$

where β is the pitch angle (deg), $F_{avg}$ is the average of the left and right front wheel elevation, $R_{avg}$ is the average of the left and right rear wheel elevation and $V_B$ is the vehicle wheel base. Persons of ordinary skill in the art will appreciate that the principles described in the above equation may be used to determine pitch angles for other sensor configurations, depending on the specific application being used.

In one example, a pitch angle sensor (e.g., 402) may be installed on the vehicle, which is configured to determine the pitching angle β1 between vehicle and the road surface. At the same time, another angle sensor may be attached to the camera (e.g., 104, 408) to get the angle β2 between camera optical axis and the horizontal level. The pitching angle then can be calculated from a planar D-value of the two angle sensor via β1-β2.

Speed and throttle sensor 404 may be configured as a vehicle speed sensor (VSS) and may be configured between an axle and a wheel of the vehicle. The VSS may operate from a magnet connected at the back of a transmission housing behind the speedometer. During operation, one portion of the VSS senses the output of the transmission, and an opposite side may be connected to a rotating magnet, which generates a voltage. This voltage is then transmitted to a processor (e.g., 107) that calculates the speed proportional to the moving vehicle. During a vehicle's movement, the VSS will generate a plurality of pulses in response to one rotation of the magnet.

In some examples, the speed and throttle sensor 404 may be configured as a Hall-Effect VSS or a Reed switch-type VSS. A Hall-Effect VSS may be located on the differential gear housing and be configured to monitor the output speed of the transaxle. The Hall-Effect sensor may use its own reference voltage signal and also be used for anti-lock braking systems in vehicles, by timing the speed of the wheel and the shaft. The sensor may include an internal transistor, which is activated by the moving relcutor ring. As the reluctor (the 'fingers' on the brake-disk) moves against the Hall Effect sensor, it creates a magnetic field that generates a voltage. This voltage activates the transistor on the Hall Effect sensor. The voltage is then transmitted through a conductor to the processing unit of the anti-lock brake system, which counts the voltage peaks and divides them by the time duration, to measure the velocity of the moving vehicle. The voltage signal only drops to zero when the 'fingers' on the brake-disk pass and have no contact with the sensor.

Reed switch-type sensors consist of a magnet and reed switch. In comparison to the Hall Effect sensor, a magnet (powered by a speedometer cable) is required to mechanically turn the reed switch on and off (approximately four times per one complete rotation of the magnet). This allows the calculation of pulse numbers per second and therefore, the measurement of vehicle speed. Reed switch-type sensors are active and generate a voltage in response to the continuous rotation of a magnet in close contact with a probe. The voltage generated is directly proportional to the speed at which the magnet rotates.

A throttle sensor of 404 may be configured to monitor the position of a throttle valve in the vehicles. It may also be viewed as a potentiometer that provides variable resistance depending upon the position of the throttle valve. The throttle sensor may be mounted on the throttle body. It senses the position of the throttle valve or butterfly valve and transmits the information to the Engine Control Unit (e.g., 102). This sensor may monitor how far down the accelerometer pedal is pushed and gives an output current determining the position of the pedal. The throttle sensor may be arranged in a plurality of configurations, including built-in end switches (Closed Throttle Position Sensor), a potentiometer type, and/or some combination of both these types.

During operation, data from the pitch angle sensor 402 and speed and throttle sensor 404 may be used by a processor (e.g., 107) to determine if vehicle 101 is traversing a steep enough of an incline (e.g., 30 degrees or more) to trigger an enhanced camera view (or "hill view assist"), and if the vehicle has passed an apex of a hill in order to deactivate the camera. In some examples, the vehicle 101 may use only the data from pitch angle sensor 402 in order to determine if the enhanced camera view should be triggered. In other examples the vehicle may only use data from speed and throttle sensor 404 in order to determine if the enhanced camera view should be triggered. In further examples, vehicle 101 may use data from both the pitch angle sensor 402 and speed and throttle sensor 404 in order to determine if the enhanced camera view should be triggered In still further examples, the vehicle 101 may also utilize data from map/GPS 103 to provide additional robustness to the data from pitch angle sensor 402 and/or speed and throttle sensor 404. When a vehicle initially climbs a hill (see FIGS. 3A-3B), the processor (e.g., 107) uses data from pitch angle sensor 402 and/or speed and throttle sensor 404 to activate a camera (e.g., top view camera) to provide an enhanced camera view to the driver. When the enhanced camera view is activated, the vehicle 101 may concurrently record GPS coordinates at the points the enhanced camera view was activated and subsequently deactivated. The vehicle may then store the GPS coordinates for reuse. Thus, when the vehicle approaches the same hill at a later time, the GPS may automatically activate and deactivate the enhanced camera view based on the GPS coordinates alone. If the vehicle 101 is equipped with wireless communications (e.g., via 106), the vehicle 101 may transmit the GPS coordinates in which the enhanced camera view was activated and deactivated to a central server. The server may subsequently transmit the coordinates to other vehicles for enhanced camera view activation and deactivation. Under this configuration, a vehicle 101 may receive GPS coordinates via communications 106 that are associated with enhanced camera view activation/deactivation. When the vehicle 101 approaches a hill with a steep incline associated with the GPS coordinates, the enhanced camera view may be activated/deactivated utilizing the GPS coordinates alone.

Continuing with the example of FIG. 4, data from pitch angle sensor 402, speed and throttle sensor 404 and/or map/GPS 103 may be transmitted to processor 107, which performs processing, discussed in greater detail below, to activate and/or deactivate enhanced camera view for camera/sensors 408. In some examples, a vehicle may be configured to have modifiable sensor sensitivity, where activation of enhanced camera view may also modify the sensitivity of one or more sensors (e.g., adaptive cruise control 214, cross-traffic alert 208, etc.) to provide additional measures of safety.

Figure 5:
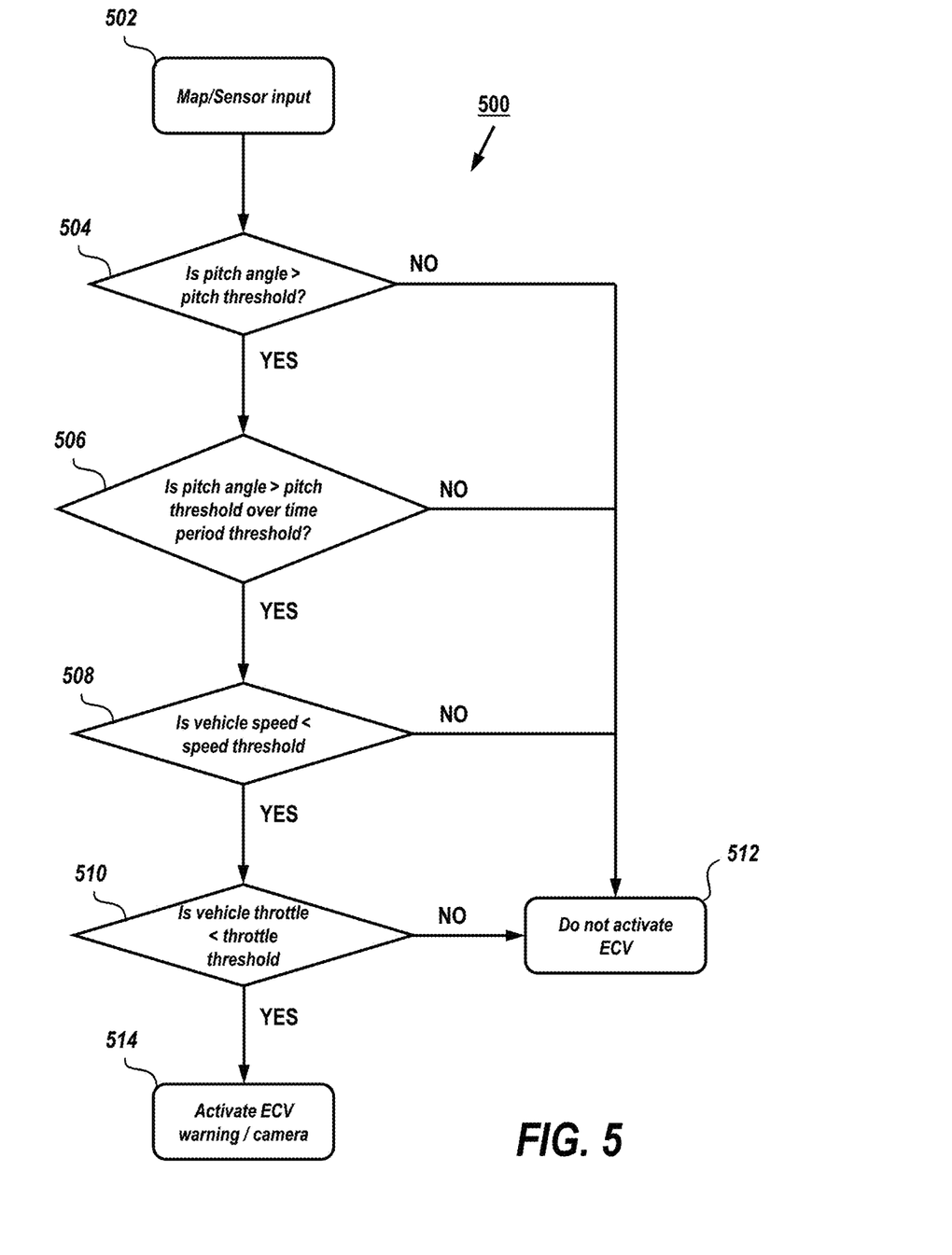
FIG. 5 shows a flow diagram for activating an enhanced camera view and/or hill warning for an enhanced camera view operating more under one example.

FIG. 5 shows a flow diagram 500 for activating an enhanced camera view and/or hill warning for an enhanced camera view operating more under one example. Here, in block 502, a vehicle (e.g., 101) receives map/sensor inputs to a processor as discussed above in connection with FIG. 4. In decision block 504, the processor determines whether a measured pitch angle is greater than a pitch angle threshold. If not ("NO") the vehicle assumes the vehicle is operating under normal operating conditions and proceeds to block 512, where the vehicle functions normally and the enhanced camera view is not activated. If, in decision block 504, the processor determines that a pitch angle is greater than a pitch angle threshold ("YES"), the process continues to decision block 506, where the processor determines if the pitch angle, greater than a pitch angle threshold, is maintained over a configured time period (e.g., 2 or more seconds). If not ("NO"), the process proceeds to block 512, where the vehicle continues to function normally and enhanced camera view is not activated.

If decision block 506 determines that the pitch angle, greater than a pitch angle threshold, is maintained over a configured time period ("YES") the process moves to decision block 508, where the processor determines if the measured vehicle speed is less than a speed threshold. If not ("NO"), the process proceeds to block 512, where the vehicle continues to function normally and enhanced camera view is not activated. If the processor determines that the vehicle speed is less than a speed threshold ("YES"), the process proceeds to decision block 510, where the processor determines if the measured vehicle throttle is greater than a vehicle throttle threshold. If not ("NO"), the process proceeds to block 512, where the vehicle continues to function normally and enhanced camera view is not activated. If the measured vehicle throttle is less than a vehicle throttle threshold ("YES"), the process moves to block 514, where one or more cameras are activated for enhanced camera view, where the video images are shown on a vehicle display. In some examples, an enhanced camera view warning may also be issued in the form of audio or visual indicia, indicating to the driver that the vehicle is approaching a potentially hazardous hill.

It should be understood by those skilled in the art that various modifications to the disclosed embodiments are contemplated in the present disclosure. In some examples, any of steps 504-510 may be configured as optional, so that ECV activation may occur more quickly, or under varying conditions. For example, once a pitch angle exceeds a configured pitch threshold (504), the ECV camera may be activated (514) without processing vehicle speed or vehicle throttle measurements. In another example, only pitch angle measurements and throttle measurements are used to determine ECV activation. In a still further example, only pitch angle measurements and vehicle speed are used to determine ECV activation. In a still further example, vehicle speed measurements (508) and/or vehicle throttle measurements (510) may be configured to activate using multiple thresholds that may be set as lower and/or upper thresholds. Under this example, a first pitch angle exceeding a first threshold (e.g., indicating an initial hill approach) may be followed by a first determination to determine if a vehicle exceeds a vehicle speed and/or vehicle throttle threshold (e.g., indicating vehicle acceleration into a hill). This may be followed by a second pitch angle measurement to determine if the second pitch angle exceeds a second threshold (e.g., indicating vehicle uphill climb). This may then be followed by a second determination to see if the vehicle falls below a vehicle speed and/or vehicle throttle threshold (e.g., indicating a vehicle slowing in the approach to a hill apex). In this example, the ECV may be activated only when the first and second thresholds are each met.

Figure 6:
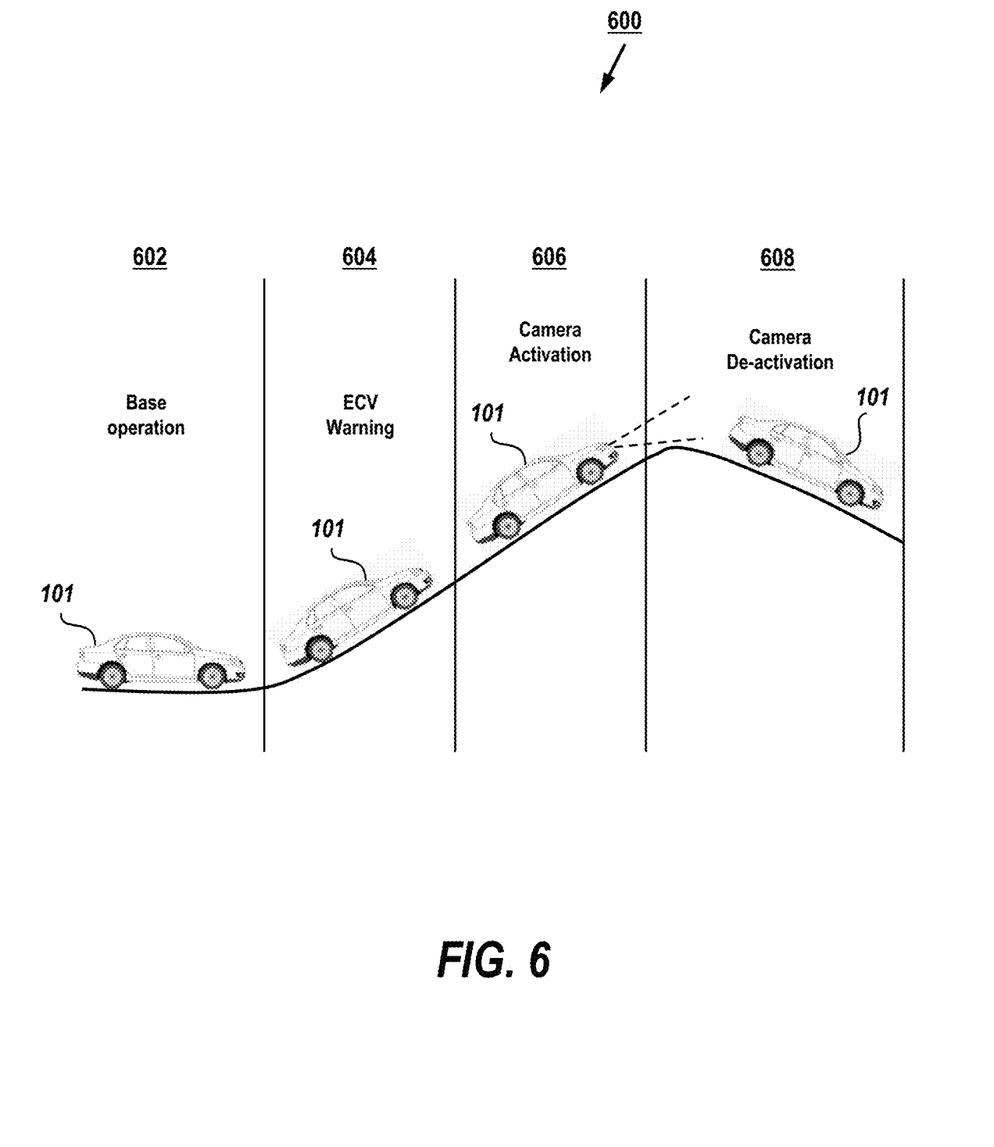
FIG. 6 shows an illustration of a vehicle entering a hill wherein an enhanced camera view (ECV) is activated, and a warning is generated before one or more cameras are activated and subsequently deactivated when the vehicle passes the hill apex under one example.

FIG. 6 shows an illustration of a vehicle 600 entering a hill wherein an enhanced camera view is activated, and a warning is generated before one or more cameras are activated and subsequently deactivated when the vehicle passes the hill apex. In this example, a vehicle is traversing a hill as shown, where the vehicle's progress is segmented in to consecutive time periods 602-608. In time period 602, the pitch angle sensor (e.g., 402) would determine that the vehicle 101 is traveling on a relatively flat surface. Since the measured pitch angle is below a configured pitch angle threshold, the vehicle 101 would not activate enhanced camera view, and would otherwise operate under normal conditions.

In time period 604, the vehicle 101 has encountered a steep incline, and the pitch angle sensor (e.g., 402) will detect that the vehicle 101 is now at a pitch angle that exceeds a configured pitch angle threshold. As the vehicle 101 requires additional thrust to climb the hill, the speed and throttle sensor (e.g., 404) will detect that the vehicle speed and/or throttle position is now exceeding a configured threshold. At this point, the processor (e.g., 107) may determine if the pitch angle, as well as the speed and throttle sensor are each exceeding their respective thresholds for a configured period of time (604). If the configured period of time is exceeded, the vehicle may issue an enhanced camera view warning to alert the driver that the camera(s) are about to be activated. In time period 606, as the vehicle approaches the apex of hill, the speed and/or throttle position may drop below configured threshold(s), wherein the camera(s) is activated and the enhanced camera view is activated in time period 606.

In time period 608, the vehicle 101 has passed the hill apex 608, and the pitch angle sensor (e.g., 402) will detect that the vehicle's pitch angle has flattened or transitioned to a negative slope (i.e., is transitioning downhill). Similarly, the speed/throttle sensor (e.g., 404) will detect the driver limiting the vehicle speed and/or throttle position as the vehicle 101 approaches and passes the apex of the hill. After the passing of the apex in 608, the pitch angle will decrease, falling below the threshold, and the speed and/or throttle position measurements would detect an increase, that brings the speed and/or throttle sensor measurements above the configured threshold(s). As this would indicate that the vehicle 101 has traversed a hill apex and that the driver field of view is no longer impaired, the enhanced view camera(s) is deactivated in time period 608, and the vehicle 101 resumes operating normally.

It should be understood by persons having ordinary skill in the art that, while specific examples are provided, numerous variations are contemplated in the present disclosure. For example, the sensors may be "cascaded" such that speed/throttle sensors are not measured by the processor until the pitch angle sensor detects a pitch angle that exceeds a threshold for a configured period of time. Similarly, the pitch angle sensor may be configured such that pitch angle measurements are not measured until the speed/throttle sensor detects a speed and/or throttle position that exceeds a threshold for a configured period of time. As mentioned above, the pitch angle sensor data may be combined with only the speed sensor data, or only the throttle sensor data, in order to issue an ECV warning and/or activate enhanced camera view cameras. Furthermore, in some examples, timers may be used to temporarily (e.g., 1-5 sec) extend the enhanced camera view camera activation (e.g., from time period 606-608) after sensor measurements fall above or below configured thresholds to ensure that the enhanced camera view is not prematurely deactivated.

Figure 7A:
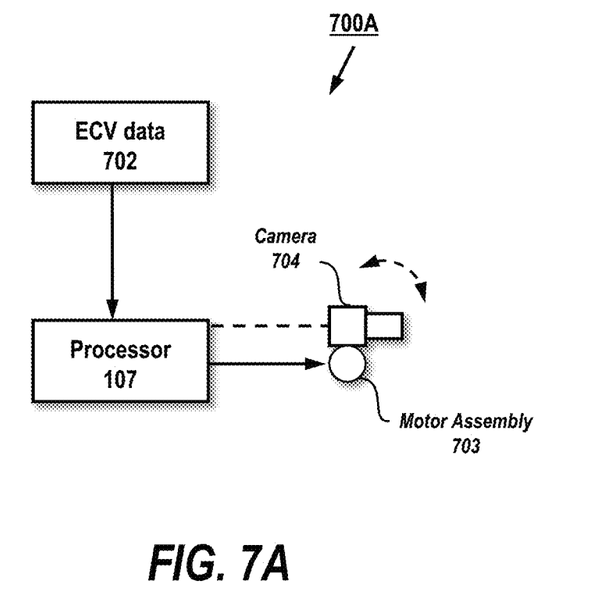
FIG. 7A shows a configuration wherein ECV data is used by a vehicle processor to modify an enhanced camera view of a vehicle camera under one example.

FIG. 7A shows a configuration 700A wherein ECV data 701 is used by a vehicle processor 107 to modify an enhanced camera view of a vehicle camera. In this example, the ECV data 702 represents any of the sensor and/or GPS data discussed above in connection with FIG. 4, which is transmitted to processor 107. In addition to activation of camera 704 (shown by the dotted line), the camera may additionally be equipped with a motor assembly 703 that physically adjusts the viewing position of the camera 704. In some examples, motor assembly 703 may be configured as an electromagnetic or piezoelectric micro-motor, and may be configured to adjust the viewing angle of camera 704. The motor assembly 703 may be configured as a variable reluctance, induction, permanent magnet micro-motor, or other motor type, depending on the application.

In some examples, as the pitch angle sensor (e.g., 402) detects a pitch angle exceeding a threshold, and the processor activates the camera 704, while also transmitting one or more control signals to the motor assembly 703 to adjust (e.g., downward or upward) the viewing angle of the camera 704. Such a configuration may provide an even greater viewing window for the driver. While the example of FIG. 7A shows a single camera, those skilled in the art will understand that the configuration may be extended to a plurality of cameras. For example, front-facing cameras may be adjusted downwards or upwards, while side-facing cameras may be adjusted laterally to widen or narrow the viewing window.

Figure 7B:
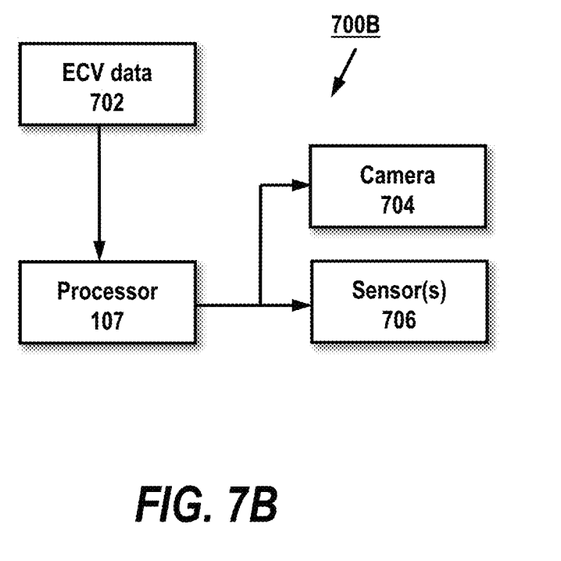
FIG. 7B shows a configuration wherein ECV data is used by a vehicle processor to modify operation of a vehicle sensor and an enhanced camera view of a vehicle camera under one example.

FIG. 7B shows a configuration 700B wherein ECV data 702 is used by a vehicle processor 107 to modify operation of a vehicle sensor 704 and an enhanced camera view of a vehicle camera 704 under an illustrative embodiment. As discussed above, ECV data 702 (e.g., pitch angle sensor, speed/throttle sensor) is transmitted to processor 107 which processes the data and uses it to generate one or more control signals to activate one or more cameras 704. In some examples, the processor 107 may also send control signals to one or more sensors 706 to modify sensor operation to supplement an enhanced camera view operating environment. Vehicle sensors (see FIG. 2) may be pre-programmed with factory settings that provide for configured operation and sensitivities during normal vehicle operation. Any or all of these sensors may be programmed with alternate settings (e.g., modified cycle/sampling time) that may be activated and deactivated substantially within the time period that enhanced camera view warnings and/or capabilities are activated. Such a configuration may provide additional safety features for drivers.

Figure 8:
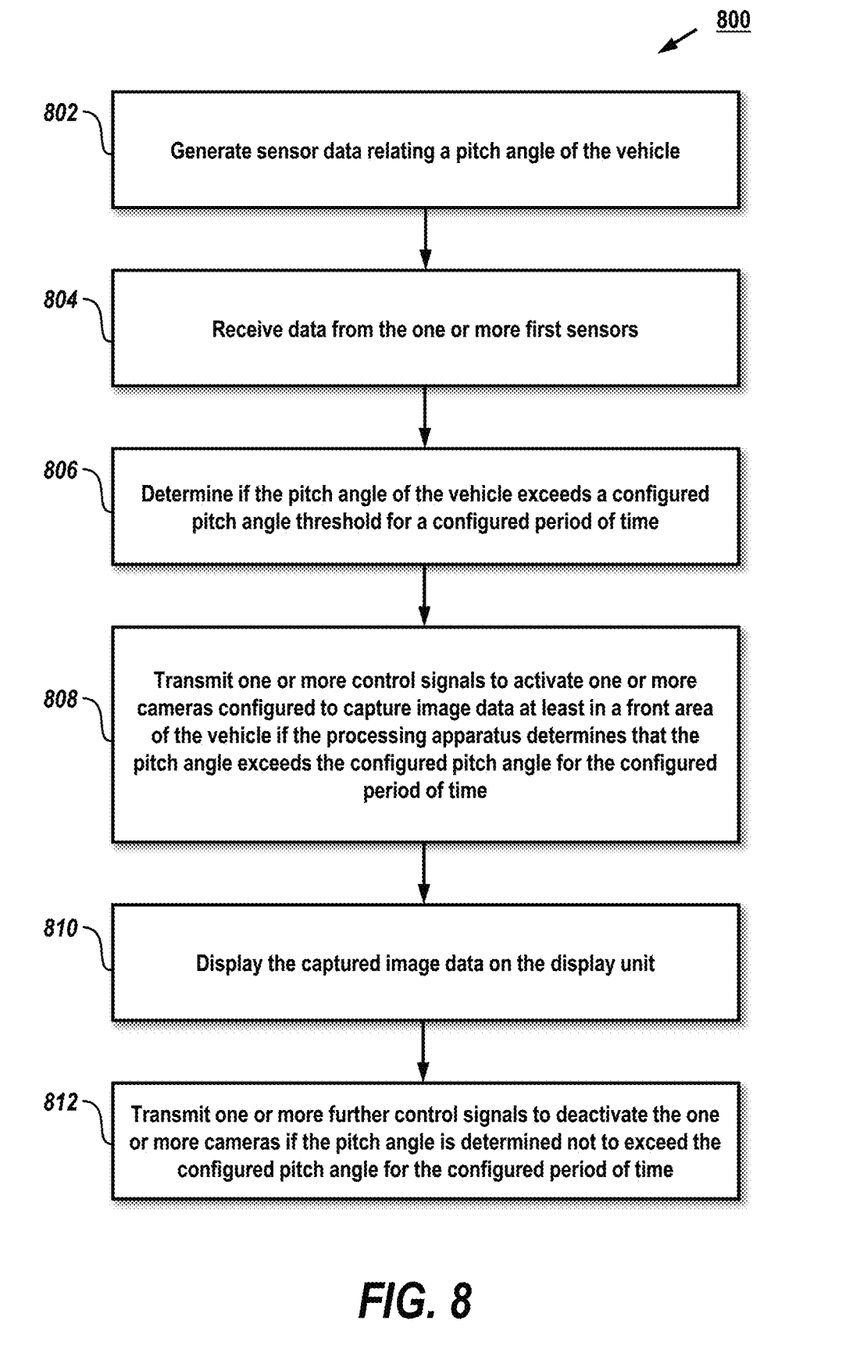
FIG. 8 shows an illustrated method for activating and deactivating an enhanced camera view operating mode under one example.

FIG. 8 shows an illustrated method for activating and deactivating an enhanced camera view operating mode under one example. In block 802, a pitch angle sensor (e.g., 402) may generate sensor data relating to a pitch angle of the vehicle. In block 804, a processing apparatus (e.g., 107) may receive data from the one or more first sensors. In block 806, the processing apparatus determines if the pitch angle of the vehicle exceeds a configured pitch angle threshold for a configured period of time. In block 808, the processing apparatus may transmit one or more control signals to activate one or more cameras configured to capture image data at least in a front area of the vehicle if the processing apparatus determines that the pitch angle exceeds the configured pitch angle for the configured period of time. In block 810, a display unit (e.g., 110) may display the capture image data. In block 812, the processing apparatus may Transmit one or more further control signals to deactivate the one or more cameras if the pitch angle is determined not to exceed the configured pitch angle for the configured period of time One or more of the components, steps, features and/or functions illustrated in FIGS. 1-8 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-4 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A driver assistance system for a vehicle, comprising:
   one or more first sensors configured to provide sensor data relating a pitch angle of the vehicle;
   at least one processing apparatus, operatively coupled to the one or more first sensors, wherein at least one processing apparatus is configured to receive data from the one or more first sensors;
   one or more cameras, operatively coupled to the processing apparatus, wherein the one or more cameras are configured to capture image data at least in a front area of the vehicle; and
   a display unit, operatively coupled to the processing apparatus, wherein the processing apparatus is configured to
      determine if the pitch angle of the vehicle exceeds a configured pitch angle threshold for a configured period of time,
      transmit one or more control signals to activate the one or more cameras if the processing apparatus determines that the pitch angle exceeds the configured pitch angle for the configured period of time, display the captured image data on the display unit, and
transmit one or more further control signals to deactivate the one or more cameras if the at least one processing apparatus determines that the pitch angle does not exceed the configured pitch angle for the configured period of time.

2. The system of claim 1, further comprising one or more second sensors, configured to receive at least one of speed data or throttle position data, wherein the at least one processing apparatus is configured to determine if the at least one of speed data or throttle position data does not meet one or more configured thresholds.

3. The system of claim 2, wherein the at least one processing apparatus is configured to transmit the one or more control signals to activate the one or more cameras if the at least one processing apparatus further determines that the at least one of speed data or throttle position data does not meet one or more configured thresholds.

4. The system of claim 1, wherein at least one of the one or more cameras comprise a top view camera.

5. The system of claim 1, wherein the at least one processing apparatus is configured to generate a warning prior to transmitting the one or more control signals.

6. The system of claim 1, further comprising a global positioning system (GPS), operatively coupled to the at least one processing apparatus, wherein the at least one processing apparatus is configured to record the position of the vehicle when transmitting the one or more control signals.

7. The system of claim 1, wherein the one or more cameras are configured to capture image data outside a driver field of view for the vehicle.

8. The system of claim 1, further comprising one or more further sensors, wherein the at least one processing apparatus is configured to transmit one or more sensor control signals to modify operation of the one or more further sensors if the at least one processing apparatus determines that the pitch angle exceeds the configured pitch angle for the configured period of time.

9. The system of claim 1, further comprising a motor operatively coupled to at least one processing apparatus and one of the least one or more cameras, wherein the at least one processing apparatus is configured to transmit a further control signal to activate the motor to modify a viewing angle of the one camera.

10. A method for enhancing a driver's field of view in a vehicle, comprising:
generating sensor data, via one or more first sensors, relating a pitch angle of the vehicle;
receiving, via a processing apparatus, data from the one or more first sensors;
determining, via the processing apparatus, if the pitch angle of the vehicle exceeds a configured pitch angle threshold for a configured period of time;
transmitting, via the processing apparatus, one or more control signals to activate one or more cameras configured to capture image data at least in a front area of the vehicle if the processing apparatus determines that the pitch angle exceeds the configured pitch angle for the configured period of time;
displaying, via a display unit, the captured image data on the display unit; and
transmitting, via the processing apparatus, one or more further control signals to deactivate the one or more cameras if the pitch angle is determined not to exceed the configured pitch angle for the configured period of time.

11. The method of claim 10, further comprising receiving, via one or more second sensors, at least one of speed data or throttle position data, and determining, via the processing apparatus, if the at least one of speed data or throttle position data does not meet one or more configured thresholds.

12. The method of claim 11, further comprising transmitting, via the processing apparatus, the one or more control signals to activate the one or more cameras if the processing apparatus further determines that the at least one of speed data or throttle position data does not meet one or more configured thresholds.

13. The method of claim 10, wherein at least one of the one or more cameras comprise a top view camera.

14. The method of claim 10, further comprising generating, via the processing apparatus, a warning prior to transmitting the one or more control signals.

15. The method of claim 10, further comprising recording, via a global positioning system (GPS), the position of the vehicle when transmitting the one or more control signals.

16. The method of claim 10, wherein the one or more cameras are configured to capture image data outside a driver field of view for the vehicle.

17. The method of claim 10, further comprising transmitting, via the processing apparatus, one or more sensor control signals to modify operation of one or more further sensors if the pitch angle is determined to exceed the configured pitch angle for the configured period of time.

18. The method of claim 10, further comprising transmitting, via the processing apparatus, a further control signal to activate a motor operatively coupled to one of the one or more cameras to modify a viewing angle of the one camera.

19. A system for enhancing a driver's field of view in a vehicle, comprising:
one or more first sensors configured to provide sensor data relating a pitch angle of the vehicle;
a processing apparatus, operatively coupled to the one or more first sensors, wherein the processor is configured to receive data from the one or more first sensors;
one or more cameras, operatively coupled to the processing apparatus, wherein the one or more cameras are configured to capture image data at least in a front area outside a driver field of view for the vehicle; and
a display unit, operatively coupled to the processing apparatus, wherein the processing apparatus is configured to
determine if the pitch angle of the vehicle exceeds a configured pitch angle threshold for a configured period of time,
transmit one or more control signals to activate the one or more cameras to capture image data if the processing apparatus determines that the pitch angle exceeds the configured pitch angle for the configured period of time,
display the captured image data on the display unit, and
transmit one or more further control signals to deactivate the one or more cameras if the at least one processing apparatus determines that the pitch angle does not exceed the configured pitch angle for the configured period of time.

* * * * *

UNITED STATES PATENT AND TRADEMARK OFFICE
CERTIFICATE OF CORRECTION

PATENT NO. : 11,214,196 B1  
APPLICATION NO. : 16/945156  
DATED : January 4, 2022  
INVENTOR(S) : Najib Hadir et al.

Page 1 of 1

It is certified that error appears in the above-identified patent and that said Letters Patent is hereby corrected as shown below:

On the Title Page

(73) Assignee should read:  
Volkswagen Aktiengesellschaft, Wolfsburg, DE (corporation)  
AUDI AG, Ingolstadt, DE (corporation)  
Dr. Ing. h.c. F. Porsche Aktiengesellschaft, Stuttgart, DE (corporation)

Signed and Sealed this  
Eighth Day of October, 2024

Katherine Kelly Vidal  
*Director of the United States Patent and Trademark Office*